(12) United States Patent
Borowski

(10) Patent No.: US 8,891,509 B2
(45) Date of Patent: Nov. 18, 2014

(54) PROXY NETWORKING DEVICE FOR A ROUTER

(75) Inventor: Olaf Borowski, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2682 days.

(21) Appl. No.: 10/886,095

(22) Filed: Jul. 6, 2004

(65) Prior Publication Data

US 2006/0007909 A1    Jan. 12, 2006

(51) Int. Cl.
*H04L 12/28* (2006.01)
*H04L 29/06* (2006.01)
*H04L 29/08* (2006.01)

(52) U.S. Cl.
CPC ............. *H04L 29/06* (2013.01); *H04L 67/2819* (2013.01); *H04L 67/28* (2013.01)
USPC ........... 370/351; 370/428; 370/392; 370/338; 370/352; 370/389; 709/225; 709/232; 709/230; 709/238

(58) Field of Classification Search
CPC ..... H04L 12/28; H04L 12/54; H04L 61/1511; H04L 69/16; H04L 69/167
USPC ......... 370/428, 351, 429, 352, 353, 389, 392, 370/265, 401, 408, 349; 709/225, 232, 230, 709/238, 250, 235, 245; 713/155; 711/216
See application file for complete search history.

(56) References Cited

U.S. PATENT DOCUMENTS

| | | | | |
|---|---|---|---|---|
| 5,859,853 | A * | 1/1999 | Carlson | 370/468 |
| 5,923,654 | A | 7/1999 | Schnell | |
| 6,049,528 | A | 4/2000 | Hendel et al. | |
| 6,151,297 | A | 11/2000 | Congdon et al. | |
| 6,195,709 | B1 * | 2/2001 | Gupner et al. | 719/316 |
| 6,339,477 | B2 * | 1/2002 | Mori | 358/1.14 |
| 6,704,786 | B1 * | 3/2004 | Gupta et al. | 709/228 |
| 6,754,800 | B2 * | 6/2004 | Wong et al. | 711/216 |
| 6,792,461 | B1 * | 9/2004 | Hericourt | 709/225 |
| 6,804,233 | B1 | 10/2004 | Congdon et al. | |
| 6,807,179 | B1 | 10/2004 | Kanuri et al. | |
| 6,965,929 | B2 * | 11/2005 | Kumar | 709/220 |
| 7,082,471 | B2 * | 7/2006 | Hericourt | 709/232 |
| 7,190,678 | B2 * | 3/2007 | Thubert et al. | 370/254 |
| 7,237,034 | B2 * | 6/2007 | Clarke et al. | 709/235 |
| 7,251,217 | B2 | 7/2007 | Wong et al. | |
| 7,383,353 | B2 | 6/2008 | Valdevit et al. | |
| 7,447,198 | B1 | 11/2008 | Banks et al. | |
| 7,542,458 | B2 * | 6/2009 | Lioy et al. | 370/349 |
| 7,633,883 | B2 | 12/2009 | Cho et al. | |

(Continued)

OTHER PUBLICATIONS

"Header Format" by John Wells, Jul. 5, 2001. [webpages] [online]. Retrieved on Jul. 6, 2004. Retrieved from the internet: http://io.irean.vt.edu/~wells/rapport/node25.html. Total pp. 2.

(Continued)

*Primary Examiner* — Jamal Javaid

(57) ABSTRACT

In one embodiment, a proxy networking device for a router is provided in order to reduce the load of the CPU of the router. In an embodiment, the proxy networking device is configured to receive an advertisement from the router, to store information in the advertisement, and to respond to a query from a host node by transmitting the advertisement to the host node. The proxy networking device may be, for example, a switch.

32 Claims, 3 Drawing Sheets

(56) References Cited

U.S. PATENT DOCUMENTS

2002/0141412 A1    10/2002  Wong et al.
2003/0028763 A1*    2/2003  Malinen et al. ............... 713/155
2004/0037278 A1     2/2004  Wong et al.
2004/0111529 A1*    6/2004  Parmar .......................... 709/245
2004/0133693 A1     7/2004  Wils et al.
2006/0155878 A1*    7/2006  Narayanan et al. ........... 709/250
2007/0171908 A1     7/2007  Tillman et al.
2007/0183346 A1*    8/2007  Thubert et al. ................ 370/254

OTHER PUBLICATIONS

"IPv6 Stateless Address Autoconfiguratlon" by S. Thompson, et al., IBM, Dec. 1998. [webpages] [online]. Retrieved on Jul. 6, 2004. Retrieved from the internet: http://asg.web.cmu.edu/rfc/rfc2462.html. Total pp. 19.

* cited by examiner

PROXY NETWORKING DEVICE FOR A ROUTER

TECHNICAL FIELD

Embodiments of the invention relate generally to communication networks, and more particularly to a proxy networking device for a router in a communication network.

BACKGROUND

On a communication network (e.g., the Internet), a router is typically a device that determines the next network point to which a packet should be forwarded so that the packet can reach its destination. The router is located at any gateway of at least two different networks and permits the connected different networks to communicate with each other. A router may create or maintain a table of the available routes and their conditions, and use this information (along with distance and cost algorithms) to determine the best route for a given packet. Typically, a packet may travel through a number of network points with routers before arriving at its destination. Routing is a function associated with the Network Layer (layer 3) in the Open Systems Interconnection (OSI) model which is the standard model of network programming.

A router is required to advertise its presences in a network. The router advertises at periodic time intervals in order to indicate that it is the dedicated router for that particular network. The advertisement from a router typically includes well defined addresses and messages.

Additionally, when a client (or other host node) is booted up and connected in the network, the client will query the network for information about the dedicated router. The dedicated router will answer to this query from the client by responding with an advertisement to the client. As mentioned above, this advertisement will indicate that the router is the dedicated router for that particular network.

The advertisement function is performed by the central processing unit (CPU) of the router. In a flat layer 2 network with a large number of connected host nodes, the multiple queries from the host nodes may disadvantageously present a high burden on the CPU of the router. The load on the CPU of the router is increased because the CPU is required to respond to multiple queries by nodes that are requesting for router information.

Therefore, the current technology is limited in its capabilities and suffers from at least the above constraints and deficiencies.

SUMMARY OF EMBODIMENTS OF THE INVENTION

In one embodiment of the invention, a proxy networking device for a router is provided in order to reduce the load of the processor of the router. In an embodiment, the proxy networking device is configured to receive an advertisement from the router, to store information in the advertisement, and to respond to a query from a host node by transmitting the advertisement to the host node. The proxy networking device may be, for example, a switch.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
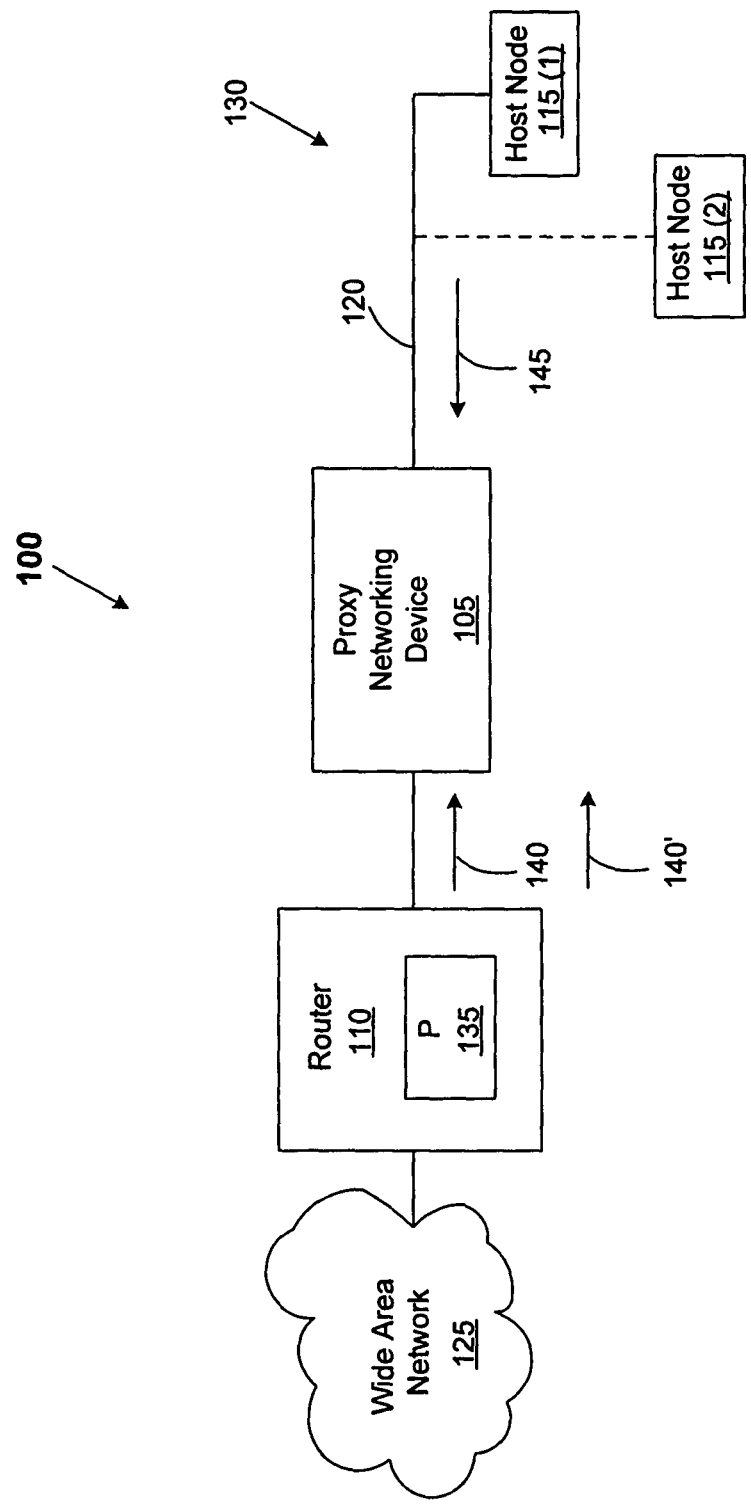
FIG. 1 is a block diagram of a network system with a proxy networking device for at least one router, in accordance with an embodiment of the invention.

FIG. 1 is a block diagram of a network system 100 with a proxy networking device 105 for at least one router 110, in accordance with an embodiment of the invention. As discussed below, one example of the proxy networking device 105 is an embodiment of a switch 105A in FIG. 2. At least one host node 115 is connected to a segment 120 that is connected to the router 110 via proxy networking device 105. In the example shown in FIG. 1, host node 115(1) and node 115(2) are connected to the segment 120. In a flat layer 2 network, hundreds of host nodes 115 may be connected to the segment 120. A host node 115 may typically be an end point node such as a client device.

As known to those skilled in the art, a segment is a portion of a network and is separated by a bridge or router from other parts of the network. Within a network segment, data can flow between any two points without having to pass through switches, routers, bridges, or hubs. The size of a segment may be defined by the number of nodes within it, or by the amount of network traffic carried by the segment. Typically, a segment is a single continuous link or may be multiple links connected by repeaters. A link may be, for example, a suitable communication media such as copper, fibre, and/or air (wireless media). In the example of FIG. 1, the segment 120 is separated by the router 110 from another network 125. As an example, the segment 120 may be part of a local area network 130, while the network 125 is a wide area network.

Assume that the local area network 130 is an IPV6 (IP Version 6) enabled network. In an IPV6 enabled network, a particular segment typically has one or more routers connected to that particular segment. The router 110 acts as a default gateway for a node 115 that connected to this segment 120. A gateway is a network point that acts as an entrance to another network. For example, the gateway can be an entrance point to a wide area network 125 for a node 115 in the segment 120. The router 110 is configured to direct a given packet of data that arrives at the gateway. If the proxy networking device 105 is a switch, then the switch will furnish the actual path in and out of the gateway for the given packet.

The proxy device 105 permits the load of the router processor 135 to be reduced by performing the following operations. The proxy device 105 listens/detects for any router advertisement 140 (i.e., advertisement message 140) from the router 110. The advertisement 140 includes the address of the router 110 and configuration data that is required for the segment 120 of the host nodes 115. The advertisement 140 is typically sent by the router 110 at a periodic time interval. For example, the advertisement 140 is sent by the router 110 once every 30 seconds, although other time intervals may be used. This advertisement procedure is part of the "Autoconfiguration" feature which is inherent in the IPV6 protocol. When the proxy device 105 detects an advertisement 140, the proxy device 105 will record the information in the advertisement in, for example, a table within the proxy device 105.

After the proxy device 105 detects an advertisement 140, the proxy device 105 will initiate a timer with a time amount that is approximately equal to the time interval between two successive transmissions of an advertisement 140 by the router 110. Assume that the proxy device 105 detects a query 145 (i.e., query message 145) from a host node 115 prior to the expiry of the timer in the proxy device 105, where the query 145 is a request for information on the dedicated router for the segment 120. This query 145 is sent by a host node 115 if, for example, the host node 115 has been booted up or during interface reset or interface toggle in the host node 115. The proxy device 105 will not pass the query 145 to the processor 135 of the router 110. Instead, the proxy device 105 will respond to the query 145 by transmitting the advertisement 140 to the requesting host node 115 if the information in the advertisement 140 is stored in the proxy device 105. The requesting host node 115 will receive the advertisement 140 from the proxy device 105. As a result, the proxy device 105 will permit the load and processing tasks in the router processor 135 to be reduced.

In a flat layer 2 network with hundreds of host nodes connected to the network, the process of answering a node query 145 can be a significant burden on the processor 135 of the router 110. In an embodiment of the invention, this process of answering the node queries 145 is performed by proxy by the proxy device 105 that had previously listened to the router advertisement 140. The proxy device 105 responds to the query 145 on behalf of the router 110 by sending the advertisement 140 to the requesting host node 115. For a host node 115 that is requesting the router information, this proxy operation by the proxy device 105 would typically be transparent.

As another example, assume that the proxy device 105 detects an advertisement 140 from the router 110. After the proxy device 105 detects an advertisement 140, the proxy device 105 can the store the information in the advertisement 140 in a memory, and can then subsequently send out the advertisement 140 to nodes 115 in the segment 120 at a periodic time interval. This permits the router processor 135 to be programmed to send out the advertisements 140 at longer periodic time intervals, because the proxy device 105 is sending out the advertisements at shorter periodic time intervals. Therefore, additional load is reduced in the router processor 135 by the proxy device 105.

If the proxy device 105 subsequently receives an updated advertisement 140' from the router 110, where the updated advertisement 140' includes updated router data and/or updated configuration data, then the proxy device 105 can then update the stored advertisement information in memory and then send out the updated advertisements 140' to nodes 115 in the segment 120 at a periodic time interval, or send out the updated advertisement 140' to a node 115 in response to a node query 145.

Figure 2:
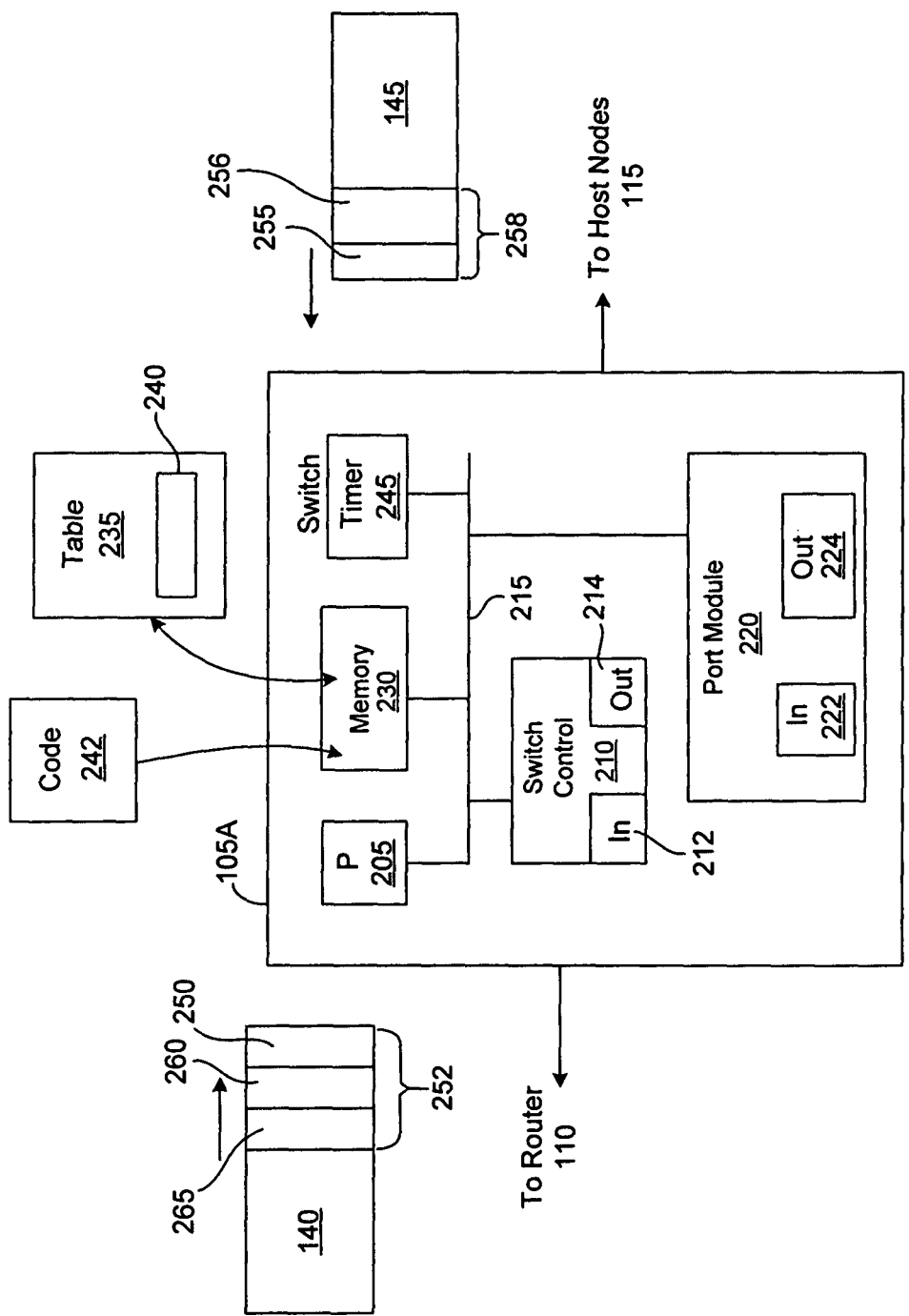
FIG. 2 is a block diagram of a proxy networking device in a switch embodiment, in accordance with an embodiment of the invention.

FIG. 2 is a block diagram of a proxy networking device 105A in a switch embodiment, in accordance with an embodiment of the invention. In networks, a switch is a device that filters and forwards packets between Local Area Network (LAN) segments. Switches operate at the data link layer (layer 2) and sometimes at the network layer (layer 3) of the OSI Reference Model and therefore support any packet protocol. The switch's processor 205 performs overall configuration and control of the operation of the switch 105A. The processor 205 operates in cooperation with a switch control 210, which is typically an application specific integrated circuit (ASIC) designed to assist the processor 205 in performing packet switching at high speeds as required by modern networks. Typically, the switch control 210 includes inbound buffer 212 and outbound buffer 214 for exchanged data over a switch bus 215 and port module 220.

The port module 220 has the ports of the switch 105A. The port module 220 typically includes one or more inbound buffer 222 for receiving packets from the network medium connected to the port module 220 and one or more outbound buffer 224 to queue data associated with the transmission of packets. The port module 220 includes circuits (not specifically shown in FIG. 2) to connect its ports to the switch bus 215 which is connected to the switch control 210.

A memory 230 will hold received packets for processing by the processor 205. As discussed below, the memory 230 can also store a table 235 that will store information 240 in an advertisement 140 that is detected by the processor 205. The processor 205 can also update the stored advertisement information 240 after the processor 205 detects an updated advertisement 140' (see FIG. 1).

The memory 230 can also store code 242 that is executed by the processor 205, where the code 242 permits the processor to process the received advertisement(s) 140 and received query (queries) 145, in accordance with an embodiment of the invention, as described herein.

A timer 245 can be initiated by the processor 205 after receiving an advertisement 140, as previously described above. The timer 245 can be implemented in hardware, software, firmware, or a combination of hardware, software, and firmware.

An advertisement 140 from the router 110 will contain a predefined address 250 that permits the switch's processor 205 to identify a detected incoming packet as an advertisement 140. The processor 205 can read the header 252 of the advertisement 140 to determine the predefined address 250. Similarly, a node query 145 from a node 115 will contain a predefined address 255 that permits the switch processor 205 to identify a detected incoming packet as a query 145. The processor 205 can read the header 258 of the query 145 to determine the predefined address 255. The header 258 also includes the address 256 of the node 115 that sent the query 145.

An advertisement 140 from the router 110 will typically be received via inbound buffer 222 in the port module 220. The inbound buffer 212 of the switch control 210 will temporarily store the advertisement 140, and the switch processor 205 can then read the header 252 of the advertisement 140 to determine if the received packet is an advertisement. If the processor 205 determines that the received packet is an advertisement 140, then the processor 205 will store the router information 260 and configuration information 265 (within the advertisement 140) into the table 235 as advertisement information 240. The processor 205 will then initiate the timer 245 with a time amount that is approximately equal to the time interval between two successive transmissions of an advertisement 140 by the router 110.

Now assume that the processor 205 detects a query 145 from a host node 115 prior to the expiry of the timer 245 in the proxy device 105, where the query 145 is a request for information on the dedicated router for the segment 120. This query 145 is sent by a host node 115 if, for example, the host node 115 has been booted up, or during interface reset or interface toggle in the host node 115. A node query 145 from a node 115 (in segment 120) will typically be received via inbound buffer 222 in the port module 220. The inbound buffer 212 of the switch control 210 will temporarily store the query 145, and the switch processor 205 can then read the header 258 of the query 145 to determine if the received packet is a node query 145 for router information. If the processor 205 determines that the received packet is a node query 145 for router information and if the processor 205 determines that advertisement information 240 from a router 110 is stored in the table 235, then the processor 205 will block the transmission of the node query 145 to the router 110. As a result, the switch control 210 will not pass the node query 145 to the router 110. If the node query 145 is blocked by the switch processor 1205, then the packet of the node query 145 is dropped since the device (switch) has the information host 115 is asking for. The switch would only forward the packet to the router if it did not have the appropriate information. This could be the case at initial boot of the switch.

In response to the node query 145 that is detected by the processor 205, the processor 205 will read the advertisement information 240 in table 235 and send the advertisement information 240 in an advertisement 140 (via packet transmission) to the requesting node 115 in the segment 145. The requesting host node 115 will receive the advertisement 140 from the proxy device 105. As a result, the proxy device 105 will permit the load and processing tasks in the router processor 135 (FIG. 1) to be reduced.

As another example, assume that the switch processor 205 detects an advertisement 140 from the router 110. After the switch processor 205 detects an advertisement 140, the switch processor 205 can the store the information in the advertisement 140 in the table 235 in memory 230, and can then subsequently send out the advertisement 140 to nodes 115 in the segment 120 at a periodic time interval. This permits the router processor 135 to be programmed to send out the advertisements 140 at longer periodic time intervals, because the switch processor 205 is sending out the advertisements at shorter periodic time intervals. Therefore, additional load is reduced in the router processor 135 by the proxy device 105.

If the switch processor 205 subsequently detects an updated advertisement 140' (see FIG. 1) from the router 110, where the updated advertisement 140' includes updated router data and/or updated configuration data, then the switch processor 205 can then update the stored advertisement information 240 in the table 235 in memory 230 and then send out the updated advertisements 140' to nodes 115 in the segment 120 at a periodic time interval, or send out the updated advertisement 140' to a node 115 in response to a node query 145.

Figure 3:
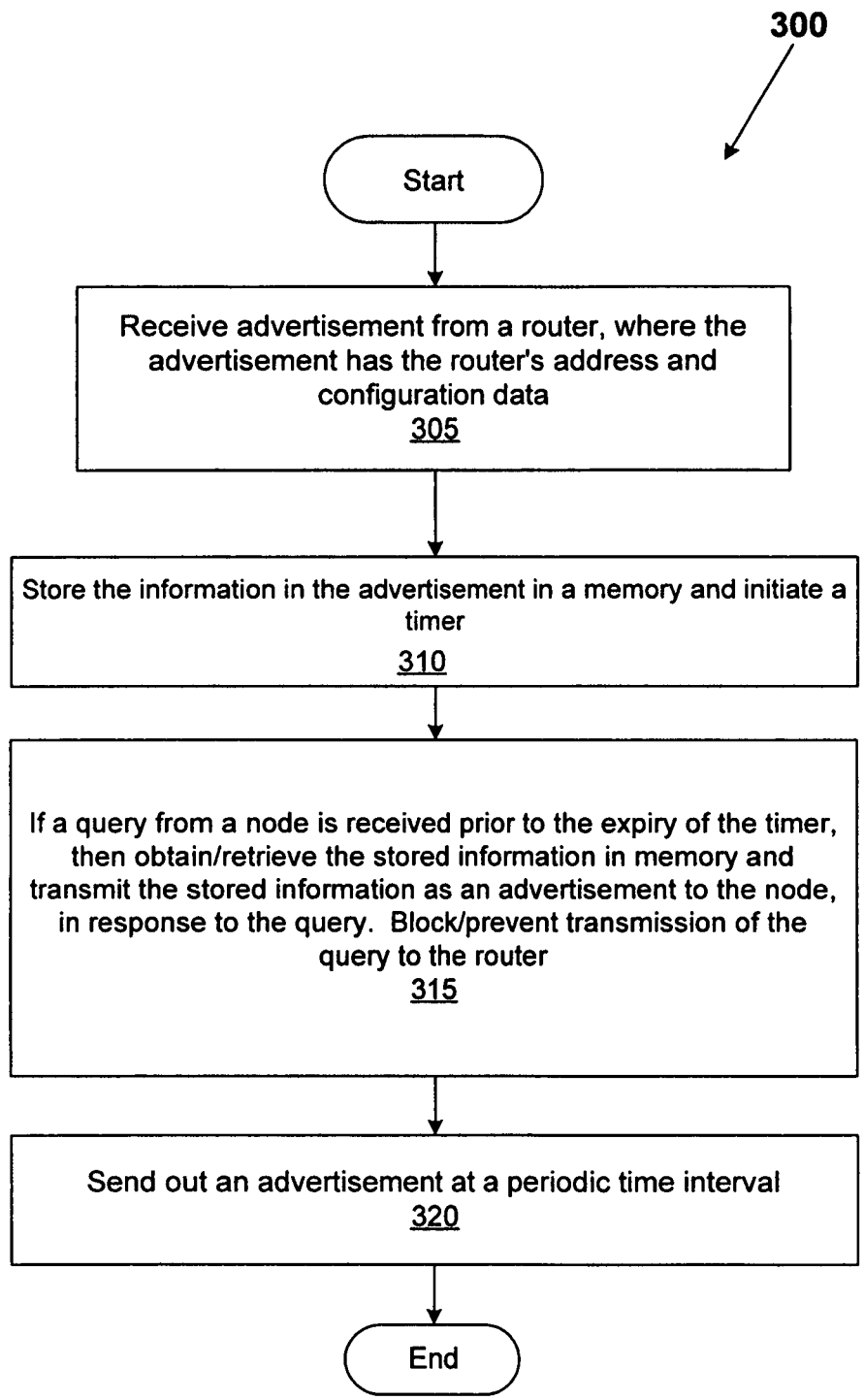
FIG. 3 is a flowchart of a method in accordance with an embodiment of the invention.

FIG. 3 is a flowchart of a method 300 in accordance with an embodiment of the invention. The proxy networking device first detects or receives (305) an advertisement from a router. In step (310), the proxy networking device will then store (into memory) the information in the advertisement and initiate a timer. As an example, the proxy networking device will store the advertisement information in a table in memory. In step (315), if a query from a host node is received by the proxy networking device, prior to the expiry of the timer, then the proxy networking device will obtain/retrieve the stored advertisement information in memory, and respond to the query from the host node by transmitting the stored information as an advertisement to the host node. In step (315), the proxy networking device will also block or prevent the transmission of the query to the router. Therefore, the query is not received by the router.

As an optional feature, in optional step (320), the proxy networking device can send out an advertisement to nodes in the segment, at a periodic time interval. Also, the proxy networking device can update the advertisement information in memory, based upon any updated advertisements that are detected by the proxy networking device.

The method of certain embodiments of the invention may be implemented in hardware, software, firmware, or a combination thereof. In one embodiment, the method is executed by software or firmware that is stored in a memory and that is executed by a suitable instruction execution system. If implemented in hardware, as in an alternative embodiment, the method can be implemented with any suitable technology that is well known in the art.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A router proxy apparatus for use as a proxy for a router, the apparatus comprising:
    a router proxy networking device configured to receive a router advertisement that is generated by the router, to store information from the router advertisement, and to respond to a query from a host node to the router by transmitting the router advertisement to the host node on behalf of the router;
    wherein the router advertisement includes an address of the router and configuration data of a network segment that connects the host node to the router proxy networking device in a first network.

2. The apparatus of claim 1, wherein the router proxy networking device comprises a switch.

3. The apparatus of claim 1, wherein the router proxy networking device reduces a load of a processor in the router.

4. The apparatus of claim 1, wherein the advertisement includes configuration data that is required for the segment with the host node.

5. The apparatus of claim 1, wherein the router proxy networking device is configured to store the information in the advertisement in a memory.

6. The apparatus of claim 1, wherein the router proxy networking device is configured to initiate a timer after receiving the router advertisement.

7. The apparatus of claim 6, wherein the router proxy networking device is configured to respond to the query from the host node by transmitting the router advertisement from the proxy networking device to the host node on behalf of the router, if the query from the host node is received by the proxy networking device prior to expiry of the timer.

8. The apparatus of claim 1, wherein the router proxy networking device is configured to prevent transmission of the query to the router, if the information in the advertisement is stored in the proxy networking device.

9. The apparatus of claim 8, wherein the router proxy networking device is configured to drop a packet of the query to the router, if the information in the advertisement is stored in the proxy networking device.

10. The apparatus of claim 8, wherein the router proxy networking device is configured to pass a packet of the query to the router, if the information in the advertisement is not stored in the proxy networking device.

11. The apparatus of claim 1, wherein the router proxy networking device is configured to update the information of the advertisement, wherein the information that is updated is stored in the proxy networking device, in response to receipt of an updated advertisement from the router.

12. The apparatus of claim 1, wherein the router proxy networking device is configured to transmit an advertisement at a periodic time interval.

13. The apparatus of claim 12, wherein the router is configured to transmit the router advertisement at a longer periodic time interval than the periodic time interval at which the router proxy networking device transmits the advertisement.

14. The apparatus of claim 1, wherein the router proxy networking device is configured to identify an advertisement based upon an address in a header of the advertisement and to store the advertisement in a memory.

15. The apparatus of claim 1, wherein the router proxy networking device is configured to identify a query based upon an address in a header of the query and to respond to the query if the router advertisement is stored in a memory.

16. A method for providing a router proxy to a router in a network, the method comprising:
    receiving, by a router proxy networking device, a router advertisement that is generated by the router;
    storing, by the router proxy networking device, information from the router advertisement; and
    responding, by the router proxy networking device, to a query from a host node to the router by transmitting the router advertisement to the host node on behalf of the router;
    wherein the router advertisement includes an address of the router and configuration data of a network segment that connects the host node to the router proxy networking device in a first network.

17. The method of claim 16, wherein the router proxy networking device comprises a switch.

18. The method of claim 16, further comprising:
    reducing a load of a processor in the router by the router proxy networking device by responding to the query from the host node on behalf of the router.

19. The method of claim 16, wherein the information from the router advertisement includes a internet protocol address of the router, the method further comprising storing the internet protocol address in a table.

20. The method of claim 16, wherein the information from the router advertisement includes configuration data that is required for a segment with the host node, the method further comprising storing the configuration data in a table.

21. The method of claim 16, further comprising:
    initiating, by the router proxy networking device, a timer after receiving the router advertisement, the timer defining a time period during which the router proxy networking device responds to queries on behalf of the router, wherein the time period of the timer is approximately equal to a time interval between two successive transmissions of the router advertisement by the router, and wherein when a subsequent router advertisement is not received within the time period a query received by the router proxy networking device past the expiration of the timer is passed to the router.

22. The method of claim 21, wherein responding to the query comprises:
    responding, by the router proxy networking device, to the query from the host node by transmitting the router advertisement from the router proxy networking device to the host node on behalf of the router, if the query from the host node is received by the router proxy networking device prior to expiry of the timer.

23. The method of claim 16, further comprising:
preventing, by the router proxy networking device, transmission of the query to the router, if the information in the advertisement is stored in the router proxy networking device.

24. The method of claim 16, further comprising:
updating, by the router proxy networking device, the stored information of the advertisement, wherein the information that is updated is stored in the router proxy networking device, in response to receipt of an updated advertisement from the router.

25. The method of claim 16, further comprising:
transmitting, by the router, the router advertisement at a first periodic time interval; and
transmitting, by the router proxy networking device, an advertisement at a second periodic time interval;
wherein the second periodic time interval is shorter than the first periodic time interval.

26. The method of claim 16, further comprising:
identifying, by the router proxy networking device, an advertisement based upon an address in a header of the advertisement.

27. The method of claim 16, further comprising:
identifying, by the router proxy networking device, a query based upon an address in a header of the query.

28. A method for providing a router proxy to a router in a network, the method comprising:
receiving a router advertisement that is generated by the router;
storing information from the router advertisement; and
responding to a query from a host node to the router by transmitting the router advertisement to the host node on behalf of the router;
wherein the router advertisement includes an address of the router and configuration data of a network segment that is connected to the host node in a first network.

29. An apparatus for providing a proxy to a router in a network, the apparatus comprising:
a router proxy apparatus for receiving a router advertisement that is generated by the router; and
a memory for storing information from the router advertisement;
wherein the router proxy apparatus responds to a query from a host node to the router by transmitting the router advertisement to the host node on behalf of the router and wherein the router advertisement includes an address of the router and configuration data of a network segment that is connected to the host node in a first network.

30. An article of manufacture for providing a proxy to a router, comprising:
a non-transitory computer-readable storage medium having computer executable instruction to:
receive a router advertisement that is generated by the router;
store information from the router advertisement; and
respond to a query from a host node to the router by transmitting the router advertisement to the host node on behalf of the router;
wherein the router advertisement includes an address of the router and configuration data of a network segment that is connected to the host node in a first network.

31. A method for providing a router proxy to a router in a network, the method comprising:
receiving, by a router proxy networking device, a router advertisement that is generated by the router;
storing, by the router proxy networking device, information from the router advertisement;
responding, by the router proxy networking device, to a query from a host node to the router by transmitting the router advertisement to the host node on behalf of the router; and
reducing a load of a processor in the router by the router proxy networking device;
wherein the router advertisement includes an address of the router and configuration data of a network segment that connects the host node to the router proxy networking device in a first network.

32. The method of claim 31, wherein responding, by the router proxy networking device, to the query from the host node to the router by transmitting the router advertisement to the host node on behalf of the router comprises transparently responding to the query such that the router proxy is transparent to the host node.

* * * * *